US012696317B2

(12) United States Patent (10) Patent No.: US 12,696,317 B2
Zhang et al. (45) Date of Patent: Jul. 28, 2026

(54) SIDELINK COMMUNICATION METHOD AND APPARATUS, AND DEVICE AND STORAGE MEDIUM

(71) Applicant: GUANGDONG OPPO MOBILE TELECOMMUNICATIONS CORP., LTD., Dongguan (CN)

(72) Inventors: Boyuan Zhang, Dongguan (CN); Qianxi Lu, Dongguan (CN); Bingxue Leng, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 287 days.

(21) Appl. No.: 18/409,365

(22) Filed: Jan. 10, 2024

(65) Prior Publication Data

US 2024/0147533 A1 May 2, 2024

Related U.S. Application Data

(63) Continuation of application No. PCT/CN2021/110149, filed on Aug. 2, 2021.

(51) Int. Cl.
*H04W 74/0816* (2024.01)
*H04W 24/08* (2009.01)
*H04W 76/20* (2018.01)
*H04W 92/18* (2009.01)

(52) U.S. Cl.
CPC ....... *H04W 74/0816* (2013.01); *H04W 24/08* (2013.01); *H04W 76/20* (2018.02); *H04W 92/18* (2013.01)

(58) Field of Classification Search
CPC . H04W 24/08; H04W 74/0816; H04W 76/20; H04W 92/18
See application file for complete search history.

(56) References Cited

U.S. PATENT DOCUMENTS

| | | | |
|---|---|---|---|
| 2018/0048498 A1 | 2/2018 | Stern-Berkowitz | |
| 2019/0075001 A1 | 3/2019 | Stern-Berkowitz | |
| 2020/0235965 A1 | 7/2020 | Stern-Berkowitz | |
| 2021/0144761 A1 | 5/2021 | Chin | |
| 2022/0022252 A1 | 1/2022 | Lee et al. | |

(Continued)

FOREIGN PATENT DOCUMENTS

| | | |
|---|---|---|
| CN | 107371168 A | 11/2017 |
| CN | 107431591 A | 12/2017 |

(Continued)

OTHER PUBLICATIONS

First Office Action of the European patent application No. 21952167. 1, issued on Mar. 31, 2025.

(Continued)

*Primary Examiner* — Brian P Cox

(74) *Attorney, Agent, or Firm* — Ladas & Parry, LLP

(57) ABSTRACT

Provided in the present application are a sidelink communication method, and a device, which relate to the field of mobile communications. The method is applied to a first terminal in sidelink transmission, and includes: executing listen-before-talk (LBT) on a grant-free scheduled resource; and when the LBT consistently fails to be triggered on the grant-free scheduled resource, executing a target operation.

12 Claims, 5 Drawing Sheets

In a SL transmission scenario based on multiple carriers, LBT is performed on unlicensed resources. The unlicensed resources are resources on all carriers in a candidate resource set

*210*

A second consistent LBT failure indication is sent to a network device in a case that the consistent LBT failure is triggered on all BWPs of the candidate resource set

*224*

(56) References Cited

U.S. PATENT DOCUMENTS

| | | | | |
|---|---|---|---|---|
| 2022/0029691 A1* | 1/2022 | Yu | ........................... | H04B 7/088 |
| 2022/0167408 A1 | 5/2022 | Lee et al. | | |
| 2022/0225136 A1* | 7/2022 | Park | ...................... | H04W 76/18 |
| 2022/0272752 A1* | 8/2022 | Zhang | .................... | H04W 76/18 |
| 2023/0156817 A1* | 5/2023 | Wang | ................. | H04W 36/0077 |
| | | | | 370/329 |
| 2024/0008077 A1* | 1/2024 | Han | ................... | H04W 74/0816 |

FOREIGN PATENT DOCUMENTS

| | | |
|---|---|---|
| EP | 3846573 A1 | 7/2021 |
| WO | 2020198584 A1 | 10/2020 |
| WO | 2020221850 A1 | 11/2020 |
| WO | 2020223692 A1 | 11/2020 |
| WO | 2021056296 A1 | 4/2021 |
| WO | 2023010257 A1 | 2/2023 |

OTHER PUBLICATIONS

ERICSSON: "Handling LBT failures", 3GPP TSG-RAN WG-2 # 107bis; R2-1913504 (Revision of R2-1910779), Chongqing, China; Oct. 14-18, 2019.

Supplementary European Search Report issued on Jul. 2, 2024 for European Patent Application No. 21952167.1.

Nokia et al, "Corrections for NR-U", R2-2008372, 3GPP TSG-RAN WG2 Meeting #111 Electronic, Aug. 28, 2020 (Aug. 28, 2020), pp. 23-24.

International Search Report in the international application No. PCT/CN2021/110149, mailed on Apr. 28, 2022.

Written Opinion of the International Search Authority in the international application No. PCT/CN2021/110149, mailed on Apr. 28, 2022.

Qualcomm Incorporated, "Discussion on relay discovery model/procedure", 3GPP TSG RAN WG2 Meeting #111-e, R2-2006556, E-Conference, Aug. 17-28, 2020, the whole document.

CATT, "Discovery Model/Procedure for NR Sidelink Relay", 3GPP TSG-RAN WG2 Meeting #111-e, R2-2006612, Electronic, Aug. 17-28, 2020, the whole document.

ZTE Corporation et al., "Discussion on relay discovery and link management", 3GPP TSG-RAN WG2 Meeting #111 electronic, R2-2006738, Online, Aug. 17-28, 2020, the whole document.

Intel Corporation, "On Sidelink Discovery for Relaying", 3GPP TSG RAN WG2 Meeting #111-e, R2-2006931, Electronic meeting, Aug. 17-28, 2020, the whole document.

LG Electronics Inc, "Consideration of discovery model/procedure for sidelink relay", 3GPP TSG-RAN WG2 Meeting #111e, R2-2008045, Online Meeting, Nov. 17-28, 2020, the whole document.

Second Office Action of the European application No. 21952167.1, issued on Oct. 1, 2025.

* cited by examiner

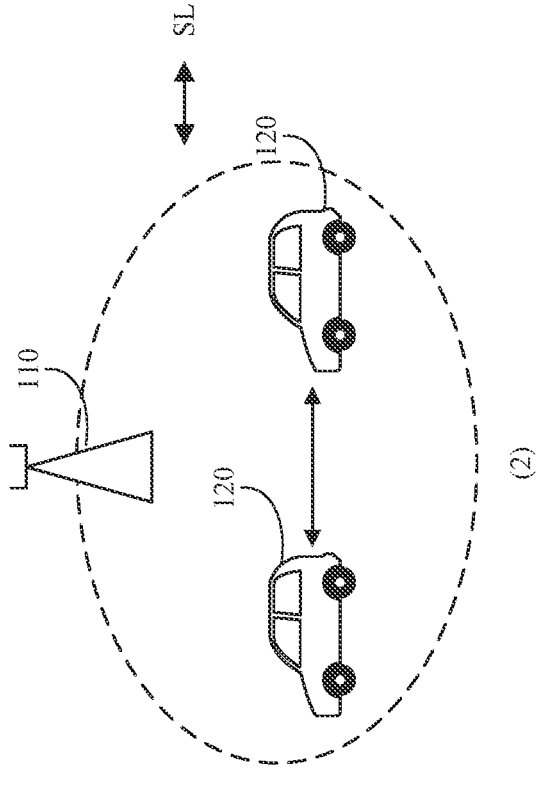
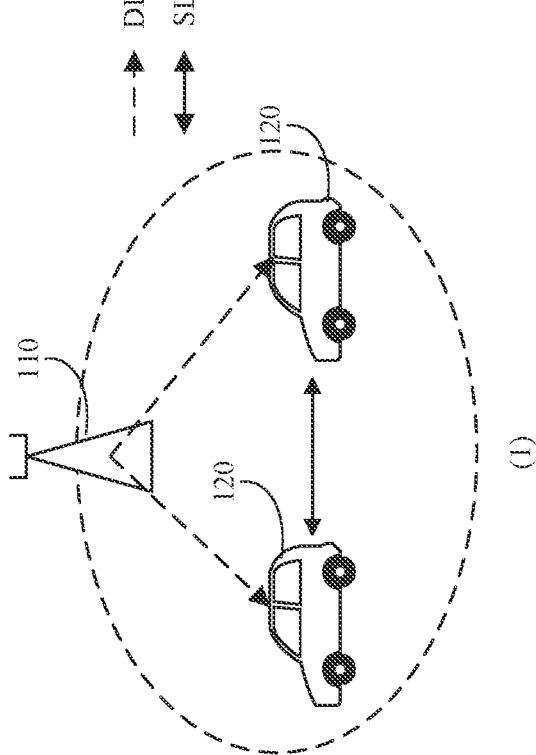
FIG. 1

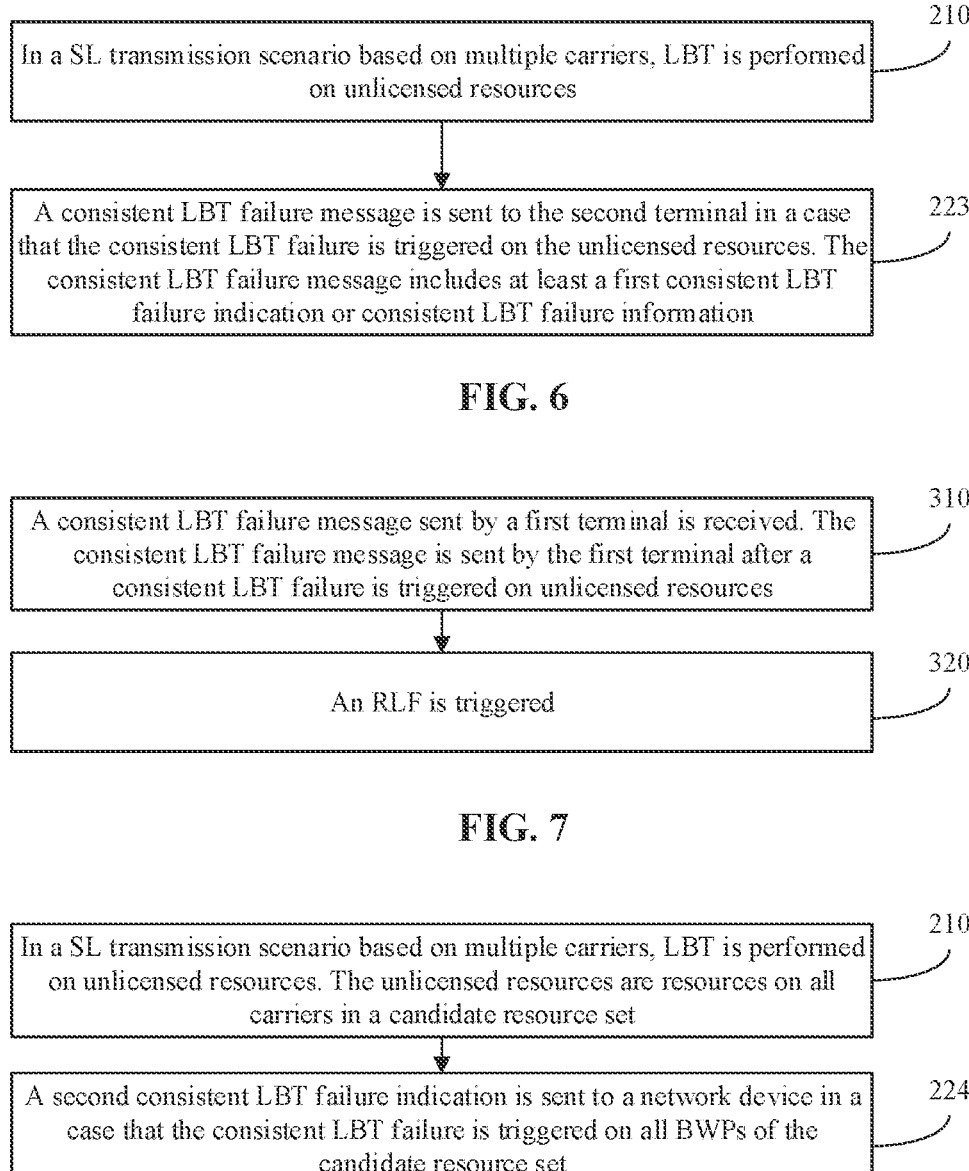

210

In a SL transmission scenario based on multiple carriers, LBT is performed on unlicensed resources

223

A consistent LBT failure message is sent to the second terminal in a case that the consistent LBT failure is triggered on the unlicensed resources. The consistent LBT failure message includes at least a first consistent LBT failure indication or consistent LBT failure information

A consistent LBT failure message sent by a first terminal is received. The consistent LBT failure message is sent by the first terminal after a consistent LBT failure is triggered on unlicensed resources

320

An RLF is triggered

In a SL transmission scenario based on multiple carriers, LBT is performed on unlicensed resources. The unlicensed resources are resources on all carriers in a candidate resource set

224

A second consistent LBT failure indication is sent to a network device in a case that the consistent LBT failure is triggered on all BWPs of the candidate resource set

FIG. 8

SIDELINK COMMUNICATION METHOD AND APPARATUS, AND DEVICE AND STORAGE MEDIUM

CROSS-REFERENCE TO RELATED APPLICATION

This application is a continuation application of International Patent Application No. PCT/CN2021/110149 filed on Aug. 2, 2021, the entire content of which is incorporated by reference herein in its entirety.

BACKGROUND

In order to achieve direct communication between terminals in a Vehicle to everything (V2X) system, an SL transmission mode is introduced.

With further extension of business scenarios of SL transmission, the SL transmission is widely applied to scenarios such as V2X, smart factory, home entertainment, etc. Limited frequency domain resources would limit evolution of later technologies. Therefore, it is necessary to consider performing the SL transmission on unlicensed resources.

SUMMARY

The disclosure relates to the field of mobile communications, and in particular to a Side Link (SL) communication method and apparatus, a device, and a storage medium. Embodiments of the disclosure provide an SL communication method and apparatus, a device, and a storage medium, which provide technical solutions of performing SL transmission by means of performing Listen Before Talk (LBT) on unlicensed resources. The technical solutions include the following operations.

According to an aspect of the disclosure, an SL communication method is provided. The SL communication method is applied to a first terminal for SL transmission and includes the following operations.

LBT is performed on unlicensed resources.

A target operation is performed in a case that a consistent LBT failure is triggered on the unlicensed resources.

According to an aspect of the disclosure, an SL communication method is provided. The SL communication method is applied to a second terminal for SL transmission and includes the following operations.

A consistent LBT failure message sent by a first terminal is received. The consistent LBT failure message is sent by the first terminal after a consistent LBT failure is triggered on unlicensed resources.

A Radio Link Failure (RLF) is triggered.

According to an aspect of the disclosure, an SL communication method device is provided. The SL communication method device is configured for realization of a first terminal for SL transmission, and includes an LBT module and an execution module.

The LBT module is configured to perform LBT on unlicensed resources.

The execution module is configured to perform a target operation in a case that a consistent LBT failure is triggered on the unlicensed resources.

According to an aspect of the disclosure, an SL communication method device is provided. The SL communication method device is configured for realization of a second terminal for SL transmission, and includes a second receiving module and a triggering module.

The second receiving module is configured to receive a consistent LBT failure message sent by a first terminal, and the consistent LBT failure message is sent by the first terminal after a consistent LBT failure is triggered on unlicensed resources.

The triggering module is configured to trigger an RLF.

According to an aspect of the disclosure, a terminal is provided. The terminal includes a processor and a transceiver connected to the processor.

The processor is configured to perform LBT on unlicensed resources.

The processor is configured to perform a target operation in a case that a consistent LBT failure is triggered on the unlicensed resources.

According to an aspect of the disclosure, a terminal is provided. The terminal includes a processor and a transceiver connected to the processor.

The transceiver is configured to receive a consistent LBT failure message sent by a first terminal, and the consistent LBT failure message is sent by the first terminal after a consistent LBT failure is triggered on unlicensed resources.

The processor is configured to trigger an RLF.

According to an aspect of the disclosure, a computer-readable storage medium on which executable instructions are stored is provided. The executable instructions are loaded and executed by a processor to implement the SL communication methods as described in the above aspects.

According to an aspect of the embodiments of the disclosure, a chip is provided. The chip includes at least a programmable logic circuit or program instructions, and is configured to implement the SL communication methods as described in the above aspects when the chip is run on a computer device.

According to an aspect of the disclosure, provided a computer program product is provided, and the computer program product enables a computer device to perform the SL communication methods as described in the above aspects when the computer program product is run on a processor of the computer device.

BRIEF DESCRIPTION OF THE DRAWINGS

In order to explain the technical solutions in the embodiments of the disclosure more clearly, the drawings required in descriptions of the embodiments would be briefly introduced below. It is apparent that the drawings in the following description are only some embodiments of the disclosure, and other drawings may also be obtained by those of ordinary skill in the art according to these drawings without any creative effort.

FIG. 1 is a diagram of a transmission mode according to an exemplary embodiment of the disclosure.

FIG. 6 is a method flowchart of an SL communication method according to an exemplary embodiment of the disclosure.

FIG. 7 is a method flowchart of an SL communication method according to an exemplary embodiment of the disclosure.

FIG. 8 is a method flowchart of an SL communication method according to an exemplary embodiment of the disclosure.

DETAILED DESCRIPTION

Figure 2:
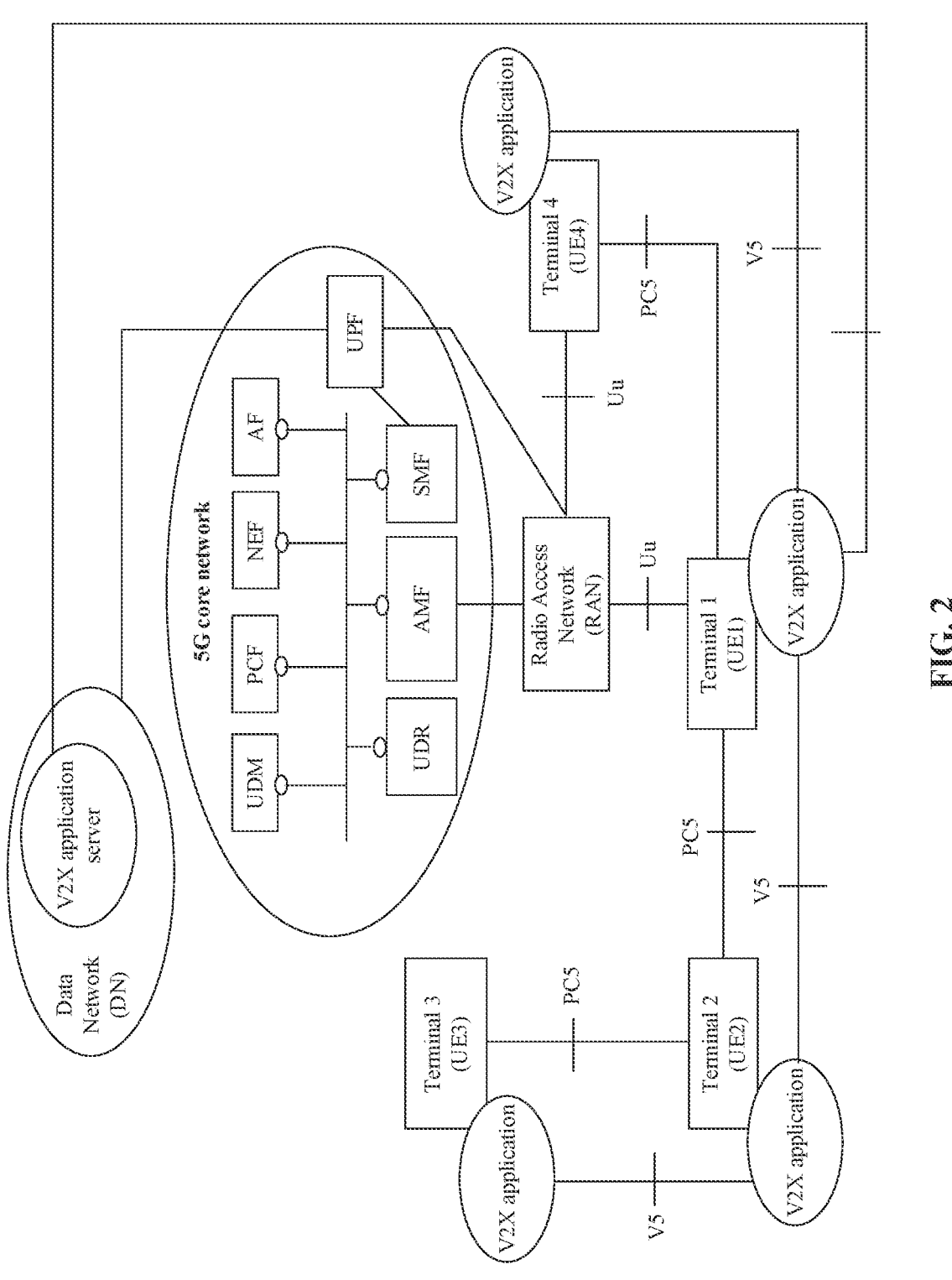
FIG. 2 is a diagram of a system architecture according to an exemplary embodiment of the disclosure.

In order to make the purpose, technical solutions and advantages of the disclosure clearer, implementations of the disclosure would be further described in detail below with reference to the drawings.

Exemplary embodiments would be described in detail here, and examples thereof are illustrated in the drawings. When the following description refers to the drawings, unless indicated otherwise, the same numeral in different drawings refers to the same or similar elements. Implementations described in the following exemplary embodiments do not represent all implementations consistent with the disclosure. Instead, these implementations are merely examples of devices and methods consistent with some aspects of the disclosure as described in detail in the appended claims.

Terms used in the disclosure are only for the purpose of describing particular embodiments, and are not intended to limit the disclosure. Singular forms "a/an", "said" and "the" as used in the disclosure and the appended claims are also intended to include plural forms, unless the context clearly indicates other meanings. It should also be understood that the term "and/or" as used here refers to and includes any or all possible combinations of one or more listed associated items.

It should be understood that although terms "first", "second", "third" or the like may be used in the disclosure to describe various information, these information should not be limited to these terms. These terms are only intended to distinguish information of the same type from one another. For example, without departing from the scope of the disclosure, first information may also be referred to as second information. Similarly, the second information may also be referred to as the first information. Depending on the context, a word "if" as used here may be interpreted as "at a time of . . . " or "when . . . " or "in response to determining . . . ".

Firstly, nouns involved in the embodiments of the disclosure are briefly introduced.

1. Long Term Evolution (LTE) Device-to-Device (D2D)/ Vehicle to everything (V2X):

V2X: it is a key technology of a future intelligent transportation system, and mainly studies vehicle data transmission schemes based on a 3rd Generation Partnership Project (3GPP) communication protocol. The V2X communications include Vehicle to Vehicle (V2V) communication, Vehicle to Infrastructure (V2I) communication and Vehicle to People (V2P) communication. The V2X applications would improve driving safety, reduce congestion and vehicle energy consumption, improve traffic efficiency, etc.

Side Link (SL) transmission: it is a D2D communication mode, and has high spectral efficiency and a low transmission delay. D2D communication is an SL transmission technology. Different from a mode where communication data is received or sent by a network device in a traditional cellular system, a V2X system adopts a direct terminal-to-terminal communication mode, and thus has high spectral efficiency and a low transmission delay. Two transmission modes of the SL transmission are defined in the 3GPP, i.e., mode 1 and mode 2.

As illustrated in mode 1 in (1) of FIG. 1, a network device 110 configures transmission resources for a terminal 120, and the terminal 120 performs SL data transmission on the configured transmission resources.

As illustrated in mode 1 in (2) of FIG. 1, the network device 110 allocates a resource pool for the terminal 120, and the terminal 120 selects one or more transmission resources from the resource pool to perform the SL data transmission. Exemplarily, the terminal 120 may select transmission resources from the resource pool by way of sensing, or may select transmission resources from the resource pool by way of random selection.

In the mode 2, the terminal selects time-frequency resources from the resource pool (candidate resources) configured or pre-configured by the network device based on the resource sensing or random selection to send SL information. Therefore, a more accurate description of the resource allocation of mode 2 should be resource selection.

In a Study Item (SI) stage of a New Radio (NR) V2X, four resource allocation schemes of the mode 2 are proposed, which include mode 2a, mode 2b, mode 2c and mode 2d.

The mode 2a refers to that the terminal selects, by decoding SL control information, measuring SL receiving power or other methods, resources from the resource pool which are not reserved by other terminals or which are reserved by other terminals but have low receiving power, thereby reducing a resource collision probability and improving communication reliability. The mode 2a generally inherits main design of a resource selection mechanism in the LTE V2X mode 4, and resource selection is performed based on operations such as resource reservation, resource sensing, resource exclusion, etc.

The mode 2b is a mode where terminals perform resource selection through cooperation there-between, that is, a terminal sends auxiliary information to help other terminals to complete the resource selection. The auxiliary information may be a resource sensing result of the resource sensing performed by the terminal, or a resource suggested to be used by other terminals, etc. For example, terminal C sends the auxiliary information to terminal A and terminal B, and the terminal A and the terminal B select resources from the resource pool by using the auxiliary information and sensing results of their own resource sensing.

The mode 2c means that the network device configures or pre-configures a resource pattern for the terminal, and the terminal performs initial transmission and retransmission by using resources in the resource pattern to achieve an effect of reducing a sending delay. There may be one or more resource patterns configured by the network device. When there are multiple configured resource patterns, the terminal selects one of the resource patterns by using resource sensing or geographic location information.

In the mode 2d, the terminal directly schedules time-frequency resources for other terminals.

In the embodiments of the disclosure, a second terminal (scheduled terminal) operates in the mode 2d, and a first terminal (scheduling terminal) may operate in the mode 1 or the mode 2.

In the 3GPP, the D2D is divided into different stages for study.

Proximity based Service (ProSe): in Release (Rel)-12/13, D2D communication is studied for a ProSe scenario, which is mainly directed to public safety services. In the ProSe, a position of the resource pool in a time domain is configured (for example, the resource pool is discontinuous in the time domain), so that a User Equipment (UE) discontinuously sends/receives data on the SL, thereby achieving a power saving effect.

V2X: in Rel-14/15, the V2X system is studied for a V2V communication scenario, which is mainly directed to services of communication between vehicles moving at relatively high-speeds and communication between the vehicles and people. In the V2X, since a vehicle-mounted system is provided with continuous power supply, the main problem is the data transmission rather than the power efficiency. Therefore, continuous transmission and reception of the terminal device are required in the system design.

Wearable device (FeD2D): in the Rel-14, scenarios where the wearable device accesses a network through a mobile phone are studied, and these scenarios are mainly directed to scenarios with a low moving speed and low power access. In the FeD2D, 3GPP concludes in a pre-research stage that the network device may configure Discontinuous Reception (DRX) parameters for a remote terminal through a relay terminal. However, since this subject has not further entered a standardization stage, details on how to implement DRX configuration are inconclusive.

Multi-carrier: in the Rel-15 LTE V2X, a multi-carrier mechanism is introduced. Specifically, the multi-carrier mechanism is embodied in that UE may support data packet segmentation and data packets can be transmitted with multiple carriers to improve data transmission rate; the UE may support data packet duplication where the same data packet are duplicated into two copies and transmitted on two carriers to improve transmission reliability; and the UE may support multi-carrier reception enhancement at the receiving side. Specifically, in case of the data packet duplication, the V2X SL communication supports SL packet duplication, which is executed at a Packet Data Convergence Protocol (PDCP) layer of the UE. In case of SL packet duplication for transmission, a PDCP Protocol Data Unit (PDU) is duplicated at a PDCP entity. Duplicated Packet Data Protocol (PDP) PDUs of the same PDCP entity are submitted to two different Radio Link Control (RLC) entities and are associated with two different SL logic channels respectively. Duplicated PDP PDUs of the same PDCP entity are only allowed to be transmitted on different SL carriers. The UE may activate or deactivate the SL packet duplication based on (pre-)configuration. SL data packet duplication is not applicable for transmission with Rel-14 transmission profiles (3GPP Technical Specification (TS) 23.285 [72]). A Proximity Service Per-Packet Reliability (PPPR) value supporting the SL data packet duplication may be (pre-)configured through a PPPR threshold. In case of UE-autonomous resource selection and scheduled resource allocation, the UE should perform the SL packet duplication for data with configured PPPR values, until configuration of the packet duplication is canceled for these PPPR values. In case of the scheduled resource allocation, the UE reports a volume of data associated with one or more PPPR values and a destination to which the data belongs through an SL Buffer Status Report (BSR). Mapping of the PPPR value to a logic channel group may be configured by an eNodeB (eNB), and the PPPR value is reflected by associated logic channel group Identity Document (ID) included in the SL BSR. A list of one or more PPPR values may be reported in SL UE information by a UE with Radio Resource Control (RRC) connection.

2. NR V2X:

Based on the LTE V2X, the NR V2X is not limited to a broadcast scenario, instead, the NR V2X is further extended to unicast and multicast scenarios, and application of the V2X is studied in these scenarios.

Similar to the LTE V2X, the NR V2X may also define the above two resource authorization modes, i.e., mode 1 and mode 2. Furthermore, the terminal may be in a mixed mode. That is, the terminal may use both the mode 1 and the mode 2 for resource acquisition at the same time. The resource acquisition is indicated by means of SL authorization. That is, the SL authorization indicates time-frequency positions of corresponding Physical Sidelink Control Channel (PSCCH) and Physical Sidelink Shared Channel (PSSCH) resources.

Unlike the LTE V2X, in addition to retransmission of Hybrid Automatic Repeat reQuest (HARQ) autonomously initiated by the UE without feedback, the NR V2X introduces retransmission of the HARQ based on feedback, which is not only limited to unicast communication, but also includes multicast communication.

Same as LTE V2X, in the NR V2X, since a vehicle-mounted system is provided with continuous power supply, the main problem is the data transmission delay rather than the power efficiency. Therefore, continuous transmission and reception of the terminal device are required in the system design.

Listen Before Talk (LBT): a next Generation Node B (gNB) operates in a dynamic or semi-static channel access mode. In both channel access modes, the gNB and UE may apply the LBT before performing transmissions on a cell configured with shared spectrum channel access. When the LBT is applied, a transmitter (a sending terminal) monitors/senses a channel to determine whether the channel is idle or busy, and performs transmission only when it is sensed that the channel is idle.

When the UE detects a consistent uplink (UL) LBT failure, the UE takes actions specified in 3GPP TS 38.321 [6]. The detection is based on each Bandwidth Part (BWP) and based on all UL transmissions within the BWP. When the consistent UL LBT failure is detected on a Secondary Cell (SCell), the UE reports the failure to a corresponding gNB (a Master Node (MN) for a Master Cell group (MCG), a Secondary Node (SN) for a Secondary Cell group (SCG)) through a Medium Access Control Control Element (MAC CE) on a serving cell different from the SCell where the failure is detected. In a case that no resources are available for transmitting the MAC CE, the UE may transmit a Scheduling Request (SR). When the consistent UL LBT failure is detected on a special Cell (SpCell, including a Primary Cell (PCell) and a Primary Secondary Cell (PS-Cell)), the UE is switched to another UL BWP configured with Random Access Channel (RACH) resources on the cell, initiates the RACH, and reports the failure through the MAC CE. When multiple UL BWPs are available for switching, the selection of the UL BWP is implemented by the UE. For the PSCell, in a case that the consistent UL LBT failure is detected on all UL BWPs configured with the RACH resources, the UE declares SCG Radio Link Failure (RLF) and reports the failure to MN through SCG Failure Information. For the PCell, in a case that the UL LBT failure is detected on all UL BWPs configured with the RACH resources, the UE declares an RLF.

FIG. 2 illustrates a block diagram of a communication system supporting SL transmission according to an exemplary embodiment of the disclosure. The communication system may be a diagram of a non-roaming 5G system architecture, and the system architecture may be applied to a V2X service using a D2D technology.

The system architecture includes a Data Network (DN), in which a V2X application server required by the V2X service is provided. The system architecture further includes a 5G core network, and network functions of the 5G core network include Unified Data Management (UDM), Policy Control Function (PCF), Network Exposure Function (NEF), Application Function (AF), Unified Data Repository (UDR), Access and Mobility Management Function (AMF), Session Management Function (SMF) and User Plane Function (UPF).

The system architecture further includes a New Generation-Radio Access Network (NG-RAN) and four terminals (i.e., Terminal 1 to Terminal 4) shown exemplarily. Optionally, each terminal is provided with a V2X application or an application supporting the SL transmission. One or more access network devices (network devices) such as base stations (gNBs) are provided in the NG-RAN.

In the system architecture, the DN is connected to the UPF in the 5G core network through an N6 reference point, and the V2X application server is connected to the V2X application in the terminal through a V1 reference point. The NG-RAN is connected to AMF and UPF functions in the 5G core network, and is respectively connected to Terminal 1 and Terminal 5 through Uu reference points. The SL transmission is performed between multiple terminals through PC5 reference points, and multiple V2X applications are connected through V5 reference points. The above reference points may also be referred to as "interfaces".

"5G NR system" in the embodiments of the disclosure may also be referred to as a 5G system or an NR system, and those skilled in the art may understand its meaning. The technical solutions described in the embodiments of the disclosure may be applicable to the 5G NR system, and may also be applicable to a subsequent evolution system of the 5G NR system. The technical solutions described in the embodiments of the disclosure may be applicable to V2X applications, and may also be applicable to other applications using the SL transmission, such as public safety applications, commercial applications, etc.

Figure 3:
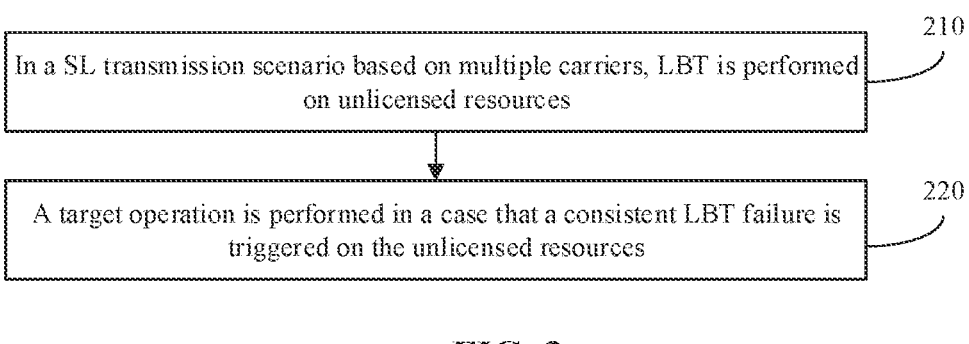
FIG. 3 is a method flowchart of an SL communication method according to an exemplary embodiment of the disclosure.

With reference to FIG. 3, a flowchart of an SL communication method according to an embodiment of the disclosure is illustrated. The method may be applied to any terminal (such as a first terminal) in the system architecture illustrated in FIG. 2. The method includes the following operations 210 to 220.

At 210, in a SL transmission scenario based on multiple carriers, the first terminal performs LBT on unlicensed resources.

The first terminal is a sending terminal in the SL transmission. The first terminal is a terminal supporting a multi-carrier scenario, and the method according to the embodiment of the disclosure is applied to the SL transmission in the multi-carrier scenario.

The unlicensed resources are resources in a candidate resource set. That is, a candidate resource set of the first terminal includes the unlicensed resources. The candidate resource set is a resource set determined by the first terminal for a Layer 2 target address, a logic channel or an HARQ process. Exemplarily, the candidate resource set includes resources on a carrier set determined by the first terminal for the Layer 2 target address, the logic channel or the HARQ process.

Exemplarily, the Layer 2 includes at least one of a Service Data Adaptation Protocol (SDAP) layer, an RRC layer, a PDCP layer, an RLC layer, or a Medium Access Control (MAC) layer.

Optionally, the candidate resource set at least includes the unlicensed resources (resources on a grant-free carrier). Based on this, the candidate resource set may further include grant resources (resources on a granted carrier).

Exemplarily, the LBT is performed at a BWP granularity. When a carrier includes a BWP, "performing the LBT on the unlicensed resources" may refer to performing the LBT on the BWP of the carrier, and at this time, the unlicensed resources are resources on the carrier. When a carrier includes multiple BWPs, "performing the LBT on the unlicensed resources" may refer to performing the LBT on a BWP of the carrier, and at this time, the unlicensed resources are resources on the BWP.

At 220, a target operation is performed in a case that a consistent LBT failure is triggered on the unlicensed resources.

Exemplarily, the consistent LBT failure is triggered in the following manner.

An LBT detection number threshold and an LBT failure detection timer of the first terminal are configured by a network device for the first terminal. A MAC layer of the first terminal receives an LBT failure indication of the unlicensed resources transmitted by a physical layer (PHY). The MAC layer starts or restarts the LBT failure detection timer, and increases an LBT failure count by 1. The MAC layer determines that the consistent LBT failure is triggered on the unlicensed resources in a case that the LBT failure count is equal to or greater than the LBT detection number threshold.

The network device configures sl-lbt-FailureInstanceMaxCount (the LBT detection number threshold) and sl-lbt-FailureDetectionTimer (the LBT failure detection timer) for the terminal, and the MAC layer of the first terminal (a sending terminal) may maintain SL_LBT_COUNTER (the LBT failure count) and initializes it to 0. When a lower layer (PHY) of the first terminal sends the LBT failure indication to the MAC layer, the first terminal needs to start or restart sl-lbt-FailureDetectionTimer and increase the SL_LBT_COUNTER by 1. In a case that the SL_LBT_COUNTER>=sl-lbt-FailureInstanceMaxCount, the MAC layer may confirm that the triggering of the LBT on a current SL-BWP fails successively.

In summary, according to the method provided in the embodiment, the LBT is performed on the unlicensed resources in the SL transmission scenario based on the multiple carriers, and available resources are selected on the unlicensed resources based on a result of the LBT to perform the SL transmission. When the LBT fails, the first terminal performs LBT consistent failure recovery or frequency domain reselection by performing a target operation, so that available resources can be selected to perform the SL transmission.

Exemplarily, the target operation performed by the first terminal after the LBT fails consistently includes at least one of frequency point switching, sending a failure message, or LBT consistent failure recovery.

1. Frequency point switching, which refers to the following.

Triggering of the LBT by the first terminal on a BWP of the candidate resource set fails successively. At this time, there still exist at least one BWP of the grant-free carrier in the candidate resource set on which the consistent LBT failure is not triggered or there exist available resources of the grant carrier, and the first terminal reselects resources from the candidate resource set to perform the SL transmission.

2. Sending a failure message, which refers to the following.

The consistent LBT failure of the first terminal is triggered on a BWP, and the LBT failure information is sent to a second terminal (a receiving terminal for the SL transmission) to inform the second terminal that the LBT fails.

3. LBT consistent failure recovery, which refers to the following.

The consistent LBT failure of the first terminal is triggered on BWPs of all the carriers of the candidate resource set, and the first terminal sends a consistent LBT failure indication to the network device, so that the network device reconfigures a new candidate resource set.

Exemplarily, in the embodiment of the disclosure, the above three target operations may be combined arbitrarily. For example, in response to that the consistent LBT failure is triggered, the first terminal may perform the above three target operations or perform any one or two of the above three target operations.

The above three target operations are described below respectively.

With respect to the above mentioned 1. Frequency point switching.

Exemplarily, the first terminal determines a candidate resource set for the SL transmission with respect to the Layer 2 target address/logic channel/HARQ process. The candidate resource set includes resources on a grant-free carrier (unlicensed resources). Descriptions are made by an example of the candidate resource set of the first terminal including unlicensed resources on a first carrier and resources on a second carrier. The first carrier is a grant-free carrier, and the second carrier is a grant-free carrier set or granted carrier.

Considering two situations, that is, there is only one BWP on a carrier and there are multiple BWPs on a carrier, the embodiments of the disclosure provide two modes, that is, mode (1) and mode (2).

Figure 4:
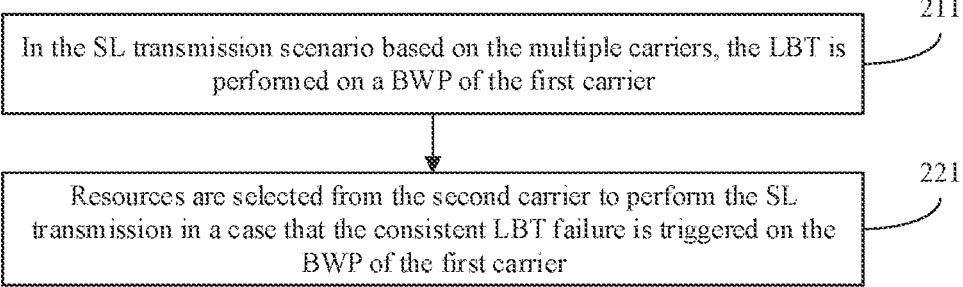
FIG. 4 is a method flowchart of an SL communication method according to an exemplary embodiment of the disclosure.

Mode (1): When there is only one BWP on a carrier, with reference to FIG. 4, a flowchart of an SL communication method according to an embodiment of the disclosure is shown. The method may be applied to any terminal (such as the first terminal) in the system architecture shown in FIG. 2. Based on the exemplary embodiment shown in FIG. 3, the operation 210 includes an operation 211, and the operation 220 includes an operation 221.

At 211, the LBT is performed on a BWP of the first carrier, in the SL transmission scenario based on multiple carriers.

At 221, resources are selected from the second carrier to perform the SL transmission in a case that the consistent LBT failure is triggered on the BWP of the first carrier.

Exemplarily, the first terminal traverses the candidate resource set to select available resources from the candidate resource set to perform the SL transmission. In a case that triggering of the LBT by the first terminal on the BWP of the first carrier fails consistently, and traversal of the candidate resource set is not finished, the first terminal is switched to a next carrier. In a case that the carrier is a grant-free carrier, the first terminal continues to perform the LBT on the carrier. In a case that the LBT is successful, the first terminal performs the SL transmission by using available resources on the carrier. In response to that the carrier is a granted carrier and there are available resources, the first terminal performs the SL transmission by using the available resources. A strategy for the first terminal to traverse the candidate resource set may be arbitrary, which is not limited in the embodiment of the disclosure.

That is:

The first terminal performs the LBT on a BWP of the second carrier in a case that the second carrier is a grant-free carrier. The first terminal selects available resources on the second carrier to perform the SL transmission in a case that a LBT success is triggered on the BWP of the second carrier. In a case that the consistent LBT failure is triggered on the BWP of the second carrier and traversal of the first terminal on carriers in the candidate resource set is completed, the LBT consistent failure recovery is performed. In a case that the consistent LBT failure is triggered on the BWP of the second carrier and traversal of the first terminal on carriers in the candidate resource set is not completed, available resources are reselected from remaining untraversed carriers to perform the SL transmission.

The first terminal selects the available resources on the second carrier to perform the SL transmission in a case that the second carrier is a granted carrier.

Exemplarily, in response to that the consistent LBT failure is triggered on SL-BWPs of not all selected carriers for the Layer 2 target address/logic channel/HARQ process, a resource reselection may be triggered for the Layer 2 target address/logic channel/HARQ process. A further resource reselection may trigger a carrier reselection, and the MAC entity of the first terminal may reselect other grant-free carriers to perform the LBT and send data.

Figure 5:
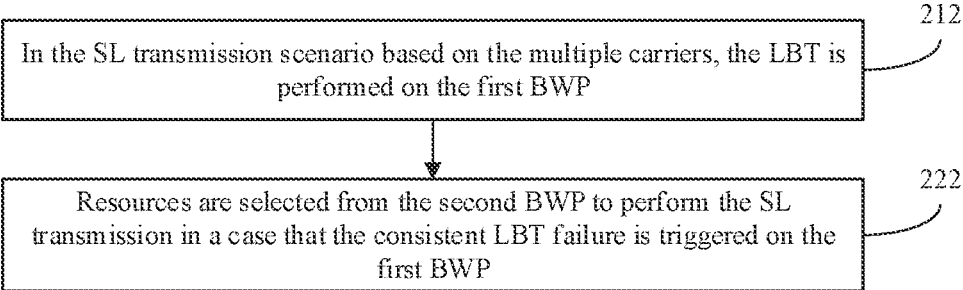
FIG. 5 is a method flowchart of an SL communication method according to an exemplary embodiment of the disclosure.

Mode (2): When there are multiple BWPs on a carrier, with reference to FIG. 5, a flowchart of an SL communication method according to an embodiment of the disclosure is illustrated. The method may be applied to any terminal (such as the first terminal) in the system architecture shown in FIG. 2. Based on the exemplary embodiment illustrated in FIG. 3, the operation 210 includes an operation 212, and the operation 220 includes an operation 222.

At 212, in the SL transmission scenario based on the multiple carriers, the LBT is performed on a first BWP.

The candidate resource set of the first terminal includes the unlicensed resources on the first BWP and resources on a second BWP.

The first BWP is a BWP on the first carrier, the second BWP is a BWP on the first carrier. Alternatively, the second BWP is a BWP on the second carrier.

At 222, resources are selected from the second BWP to perform the SL transmission in a case that the consistent LBT failure is triggered on the first BWP.

Exemplarily, the first terminal traverses the candidate resource set to select available resources from the candidate resource set for the SL transmission. In response to that the consistent LBT failure performed by the first terminal is triggered on the first BWP and traversal of the candidate resource set is not finished, the first terminal is switched to a next BWP. In response to that a carrier to which the BWP belongs is a grant-free carrier, the first terminal continues to perform the LBT on the BWP. In response to that the LBT is successful, the first terminal performs the SL transmission by using available resources on the BWP. In response to that the carrier to which the BWP belongs is a granted carrier and there are available resources on the BWP, the first terminal performs the SL transmission by using the available resources. A strategy for the first terminal to traverse the candidate resource set may be arbitrary, which is not limited in the embodiment of the disclosure.

That is:

The LBT is performed on the second BWP in a case that a carrier to which the second BWP belongs is a grant-free carrier. Available resources are selected on the second BWP to perform the SL transmission in a case that a LBT success is triggered on the second BWP. In a case that the consistent LBT failure is triggered on the second BWP and traversal of the first terminal on BWPs in the candidate resource set is completed, the LBT consistent failure recovery is performed. In a case that the consistent LBT failure is triggered on the second BWP and traversal of the first terminal on the BWPs in the candidate resource set is not completed, the available resources are reselected from remaining untraversed BWPs to perform the SL transmission.

The available resources are selected on the second BWP to perform the SL transmission in a case that the carrier to which the second BWP belongs is a granted carrier.

In summary, according to the method provided in the embodiment, the terminal is switched to another carrier/BWP in the candidate resource set when the candidate resource set is not completely traversed after the LBT fails consistently to continue selection of transmission resources. In response to that the switched carrier is a granted carrier, available resources are selected on the granted carrier to perform the SL transmission. In response to that the switched carrier is a grant-free carrier, the LBT continues being performed so that available resources are selected to perform the SL transmission after the LBT success, which implements that the SL transmission is performed by using grant-free resources in the multi-carrier scenario.

With respect to the above mentioned 2. Sending a failure message.

With reference to FIG. 6, a flowchart of an SL communication method according to an embodiment of the disclosure is illustrated. The method may be applied to any terminal (such as the first terminal) in the system architecture illustrated in FIG. 2. Based on the exemplary embodiment illustrated in FIG. 3, the operation 220 includes an operation 223.

At 223, in a case that the consistent LBT failure is triggered on the BWP of the first carrier, a consistent LBT failure message is sent to the second terminal in a case that a consistent LBT failure is triggered on the unlicensed resources. The consistent LBT failure message includes at least a first consistent LBT failure indication or consistent LBT failure information.

The second terminal is a receiving terminal for SL transmission.

The consistent LBT failure information includes at least one of an LBT failure carrier, an LBT failure BWP, an LBT failure carrier set, an LBT failure BWP set, a target switched carrier, a target switched BWP, a target selected carrier, or a target selected BWP.

The first consistent LBT failure indication is configured to inform the second terminal that the LBT fails consistently.

The LBT failure carrier is a carrier on which the consistent LBT failure is triggered, such as the first carrier. The LBT failure BWP is a BWP on which the consistent LBT failure is triggered, such as the first BWP. The target switched carrier is a carrier to which it is switched by performing the frequency point switching, such as the second carrier. The target switched BWP is a BWP to which it is switched by performing the frequency point switching, such as the second BWP. The target selected carrier is a carrier finally selected by the first terminal to perform the SL transmission. The target selected BWP is a BWP finally selected by the first terminal to perform the SL transmission.

The consistent LBT failure message is carried on a MAC CE.

Exemplarily, the first consistent LBT failure indication and the consistent LBT failure information in the consistent LBT failure message may be carried on the same MAC CE, or may be carried on different MAC CEs.

That is, when the consistent LBT failure message includes the first consistent LBT failure indication and the consistent LBT failure information, a situation is that the first consistent LBT failure indication is carried on a first MAC CE, and the consistent LBT failure information is carried on a second MAC CE, and another situation is that the first consistent LBT failure indication and the consistent LBT failure information are carried on a third MAC CE.

In response to that the consistent LBT failure is triggered for a certain carrier/a certain BWP MAC layer, with respect to unicast, multicast or broadcast services:

1) In response to that there are still available SL resources at this time and the available resources are sufficient to hold the LBT failure indication MAC CE and subheader, the first terminal may send an LBT failure message to the second terminal.

Specifically, the LBT failure message may include at least one of an LBT failure indication, the LBT failure carrier or carrier set, the target switched carrier, a carrier to which the first terminal is ready to be switched to continue transmission of the service data.

That is, the first terminal sends the consistent LBT failure message to the second terminal on available resources for the SL transmission in a case that the available resources for the SL transmission exist.

2) In response to that there are no available SL resources at this time, the first terminal may consider sending the consistent LBT failure message in the following manners.

2.1) The first terminal may report an LBT request assistance (an SL-BSR or RRC message) to the network device, and the network device assists in performing the LBT and shares available resources on the carrier with the first terminal through Channel Occupancy Time (COT) sharing. The first terminal performs the SL transmission on unlicensed resources where the network device performs scheduling of the LBT.

That is, the first terminal sends the LBT request assistance to the network device in a case that available resources for the SL transmission do not exist. The network device receives the LBT request assistance, assists in performing the LBT, and configures auxiliary unlicensed resources for the first terminal through the COT sharing. The first terminal receives the auxiliary unlicensed resources configured by the network device for the first terminal through the COT sharing. The auxiliary unlicensed resources include available resources obtained by the network device assisting in performing the LBT. The first terminal sends the consistent LBT failure message to the second terminal on the auxiliary unlicensed resources.

Exemplarily, the LBT request assistance is carried in an SL-BSR or an RRC message.

2.2) The first terminal may perform transmission of the LBT failure message through a resource pool for transmission configured on a default granted carrier. Exemplarily, the resource pool for transmission may be a candidate resource pool of the mode 2.

That is, the consistent LBT failure message is sent to the second terminal through a candidate resource pool configured on a default granted carrier in a case that available resources for the SL transmission do not exist.

Exemplarily, the candidate resource pool is the candidate resource pool of the mode 2.

Exemplarily, "default" mentioned in the default granted carrier is interpreted as "default", and the default granted carrier is configured by the network device. Configuration of the default granted carrier may be configured in the following manners.

2.21) In case of the unicast connection, the default granted carrier may be negotiated by the first terminal and the second terminal through a Proximity Communication-Radio Resource Control (PC5-RRC) message during the establishment of the unicast connection.

That is, in case of the unicast service of the first terminal, the default granted carrier is determined through negotiation using the PC5-RRC message during the procedure that the first terminal establishes a connection with the second terminal Exemplarily, the network device configures a default granted carrier for the first terminal or the second terminal, and the first terminal and the second terminal determines to use the default granted carrier through negotiation during the establishment of the connection.

2.22) In case of the unicast, multicast or broadcast, the default granted carrier may be configured by the network device. Specifically, a configuration granularity may be Layer 2 target address/Quality of Service (QoS)/logic channel.

That is, in case of the unicast, multicast or broadcast service of the first terminal, the default granted carrier is configured by the network device. When the first terminal is in a unicast, multicast or broadcast state, the default granted carrier is configured by the network device based on the Layer 2 target address, the QoS or the logic channel.

2.3) In a case that the first consistent LBT failure indication and the consistent LBT failure information are respectively sent on two MAC CEs, the first MAC CE may be sent in the manners illustrated in 2.1) and 2.2), and resources of the second MAC CE may be scheduled by the second terminal for the first terminal.

Resources for sending the consistent LBT failure message may be provided by the second terminal. Exemplarily, the network device may configure a first LBT timer for the second terminal. In a case that the first LBT timer expires and the second terminal does not receive any data packet sent by the first terminal within a time period when the first LBT timer operates, the second terminal schedules an SL grant (SL grant resources) to the first terminal. In a case that the failure of the LBT (i.e., the consistent LBT failure) occurs to the first terminal, the first terminal may send the consistent LBT failure message to the second terminal by using the SL grant.

Exemplarily, the first consistent LBT failure indication is carried on the first MAC CE, and the consistent LBT failure information is carried on the second MAC CE. The first terminal sends the first MAC CE to the second terminal, and the first MAC CE includes the first consistent LBT failure indication. The second terminal receives the first MAC CE sent by the first terminal, the first MAC CE carries the first consistent LBT failure indication. In response to the first MAC CE, the second terminal starts the first LBT timer, and the first LBT timer is configured by the network device for the second terminal. The SL grant resources are scheduled for the first terminal in a case that the first LBT timer expires and SL transmission data sent by the first terminal is not received. The SL grant resources are used for sending the consistent LBT failure information. The first terminal receives SL grant resources scheduled by the second terminal for the first terminal, and the SL grant resources are scheduled by the second terminal for the first terminal in a case that the first LBT timer expires and SL transmission data sent by the first terminal is not received. The first LBT timer is started when the second terminal receives the first MAC CE. The second MAC CE is sent to the second terminal on SL transmission resources, and the second MAC CE includes the consistent LBT failure information.

In summary, according to the method provided in the embodiment, after the consistent LBT failure is triggered, the first terminal sends the consistent LBT failure message to the second terminal to inform the second terminal that the LBT fails consistently and the carrier, BWP, carrier set or BWP set of the consistent LBT failure, and indicates the target switched carrier or the target switched BWP to the second terminal, so that the second terminal can respond to the consistent LBT failure, thereby implementing the SL transmission on the unlicensed resources.

Exemplarily, based on the above "2. Sending a failure message", the second terminal may trigger an RLF after receiving the consistent LBT failure message.

With reference to FIG. 7, a flowchart of an SL communication method according to an embodiment of the disclosure is illustrated. The method may be applied to any terminal (such as the second terminal) in the system architecture illustrated in FIG. 2. The method includes the following operations 310 to 320.

At 310, the second terminal receives a consistent LBT failure message sent by a first terminal. The consistent LBT failure message is sent by the first terminal after a consistent LBT failure is triggered on unlicensed resources.

The consistent LBT failure message includes at least a first consistent LBT failure indication or consistent LBT failure information. The consistent LBT failure information includes at least one of an LBT failure carrier, an LBT failure BWP, an LBT failure carrier set, an LBT failure BWP set, a target switched carrier, or a target switched BWP.

Exemplarily, the first terminal is connected to the second terminal by unicast.

At 320, the second terminal triggers an RLF.

The network device may configure a second LBT timer for the second terminal. In a case that the second terminal receives the consistent LBT failure message sent by the first terminal, and in response to that the first terminal configures the target switched carrier/target switched BWP/default granted carrier in the consistent LBT failure message, the second terminal may start the second LBT timer. In a case that the second LBT timer expires and the second terminal does not receive new data sent by the first terminal on the indicated target switched carrier/target switched BWP/default granted carrier, the second terminal may trigger the RLF.

That is, the consistent LBT failure message includes the target switched carrier or the target switched BWP. The second terminal receives the second LBT timer configured by the network device for the second terminal. The second terminal starts the second LBT timer in response to the consistent LBT failure message. The second terminal triggers the RLF in a case that the second LBT timer expires and the second terminal does not receive SL transmission data sent by the first terminal on target transmission resources. The target transmission resources include at least one of the target switched carrier, the target switched BWP, or a default granted carrier.

In a case that the first terminal triggers the consistent LBT failure on a current carrier and the first terminal is not configured with the target switched carrier/target switched BWP/default granted carrier which may be used for switching, the consistent LBT failure message sent by the first terminal does not carry the carrier switching indication, and the second terminal immediately triggers the RLF in response to receiving the consistent LBT failure message.

That is, the consistent LBT failure message does not include the target switched carrier or the target switched BWP. The RLF is triggered in response to the consistent LBT failure message.

In summary, according to the method provided in the embodiment, after the second terminal receives the consistent LBT failure message sent by the first terminal, in a case that the consistent LBT failure message indicates the target switched carrier or the target switched BWP or the default granted carrier, the second terminal starts the timer. In a case that data packets sent by the first terminal are not received before the timer expires, the first terminal triggers the RLF. In a case that the consistent LBT failure message does not indicate the target switched carrier or the target switched BWP or the default granted carrier, the second terminal triggers the RLF in response to receiving the consistent LBT failure message.

With respect to the above mentioned 3. LBT consistent failure recovery.

With reference to FIG. 8, a flowchart of an SL communication method according to an embodiment of the disclosure is illustrated. The method may be applied to any terminal (such as the first terminal) in the system architecture illustrated in FIG. 2. Based on the exemplary embodiment illustrated in FIG. 3, the operation 220 includes an operation 224.

At 210, LBT is performed on unlicensed resources in a SL transmission scenario based on multiple carriers. The unlicensed resources are resources on all carriers in the candidate resource set.

At 224, a second consistent LBT failure indication is sent to the network device in a case that a consistent LBT failure is triggered on all BWPs of the candidate resource set.

Exemplarily, the second consistent LBT failure indication is carried in an RRC signaling. The second consistent LBT failure indication includes the candidate resource set determined by a MAC layer for a Layer 2 target address, a logic channel or an HARQ process.

In response to that the consistent LBT failure is triggered on SL-BWPs of all selected carriers for the Layer 2 target address/logic channel/HARQ process, the MAC layer may report the consistent LBT failure to an upper layer. In a case that the RRC layer receives a third consistent LBT failure indication reported by the MAC layer, the RRC layer may report the second consistent LBT failure indication for this destination ID (target address) to the network device through UL resources via the RRC signaling. Furthermore, the second consistent LBT failure indication may be associated with a carrier set selected by the MAC layer for this destination ID. The network device may reconfigure a carrier set for this destination ID.

That is, the MAC layer of the first terminal transmits the third consistent LBT failure indication to the RRC layer in a case that a consistent LBT failure is triggered on all BWPs of the candidate resource set. The RRC layer sends the second consistent LBT failure indication to the network device through the RRC signaling in a case that the RRC layer receives the third consistent LBT failure indication from the MAC layer.

Exemplarily, after the operation 224, the first terminal may also receive the transmission resources configured by the network device for the SL transmission. Resources are selected from the newly configured transmission resources for the SL transmission.

In summary, according to the method provided in the embodiment, the consistent LBT failure indication is sent to the network device after the consistent LBT failure is triggered on BWPs of all carriers of the candidate resource set, so that the network device reconfigures the carriers for the first terminal for the SL transmission. Therefore, after the LBT on the unlicensed resources fails, the first terminal can perform the SL transmission according to resources reconfigured by the network device.

Figure 9:
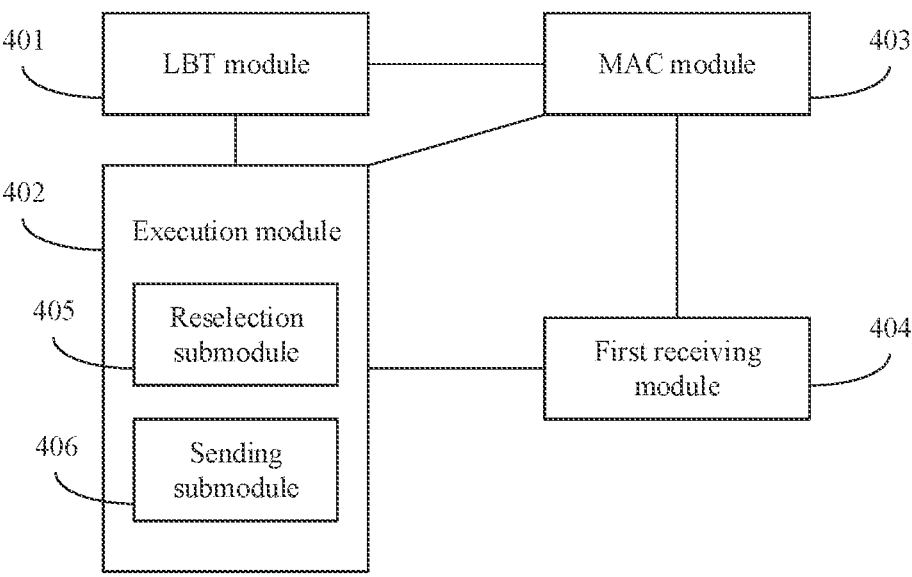
FIG. 9 is a block diagram of an SL communication device according to an exemplary embodiment of the disclosure.

FIG. 9 shows a block diagram of an SL communication method device according to an exemplary embodiment of the disclosure, the device is configured to implement a first terminal for SL transmission, or one or more modules in the first terminal, and the device includes an LBT module 401 and an execution module 102.

The LBT module 401 is configured to perform LBT on unlicensed resources.

The execution module 402 is configured to perform a target operation in a case that a consistent LBT failure is triggered on the unlicensed resources.

In an optional embodiment, the device further includes a MAC module 403.

The MAC module 403 is configured to receive an LBT failure indication of the unlicensed resources transmitted by a PHY through a MAC layer of the first terminal.

The MAC module 403 is configured to start or restart an LBT failure detection timer through the MAC layer, and increases an LBT failure count by 1.

The MAC module 403 is configured to determine that the consistent LBT failure is triggered on the unlicensed resources through the MAC layer determines in a case that the LBT failure count is equal to or greater than an LBT detection number threshold.

In an optional embodiment, the apparatus further includes that:

the LBT detection number threshold and the LBT failure detection timer are configured by a network device for the first terminal.

In an optional embodiment, the target operation includes at least one of frequency point switching, sending a failure message, or LBT consistent failure recovery.

In an optional embodiment, the target operation includes the frequency point switching, a candidate resource set of the first terminal includes unlicensed resources on a first carrier and resources on a second carrier, and the execution module 402 includes a reselection submodule 405.

The LBT module 401 is configured to perform the LBT on a BWP of the first carrier.

The reselection submodule 405 is configured to select resources from the second carrier to perform the SL transmission in a case that the consistent LBT failure is triggered on the BWP of the first carrier.

In an optional embodiment, the reselection submodule 405 is configured to: perform the LBT on a BWP of the second carrier in a case that the second carrier is a grant-free carrier; and select available resources on the second carrier to perform the SL transmission in a case that the LBT success is triggered on the BWP of the second carrier;

or, select the available resources on the second carrier to perform the SL transmission in a case that the second carrier is a granted carrier.

In an optional embodiment, the target operation includes the frequency point switching, a candidate resource set of the first terminal includes the unlicensed resources on a first BWP and resources on a second BWP, and the execution module 402 includes a reselection submodule 405.

The LBT module 401 is configured to perform the LBT on the first BWP.

The reselection submodule 405 is configured to select resources from the second BWP to perform the SL transmission in a case that the consistent LBT failure is triggered on the first BWP.

The first BWP is a BWP on a first carrier, and the second BWP is a BWP on the first carrier or a second carrier.

In an optional embodiment, the reselection submodule 405 is configured to: perform the LBT on the second BWP in a case that a carrier to which the second BWP belongs is a grant-free carrier; and select available resources on the second BWP to perform the SL transmission in a case that the LBT success is triggered on the second BWP;

or, select the available resources on the second BWP to
       perform the SL transmission in a case that the carrier to
       which the second BWP belongs is a granted carrier.

In an optional embodiment, the target operation includes sending the failure message. The SL transmission further includes a second terminal. The execution module 402 includes a sending submodule 406.

The sending submodule 406 is configured to send a consistent LBT failure message to the second terminal in a case that the consistent LBT failure is triggered on the unlicensed resources. The consistent LBT failure message includes at least a first consistent LBT failure indication or consistent LBT failure information.

The consistent LBT failure information includes at least one of an LBT failure carrier, an LBT failure BWP, an LBT failure carrier set, an LBT failure BWP set, a target switched carrier, a target switched BWP, a target selected carrier, or a target selected BWP.

In an optional embodiment, the consistent LBT failure message is carried on a MAC CE.

In an optional embodiment, the consistent LBT failure message includes the first consistent LBT failure indication and the consistent LBT failure information.

The first consistent LBT failure indication is carried on a first MAC CE, and the consistent LBT failure information is carried on a second MAC CE;

or, the first consistent LBT failure indication and the consis-
       tent LBT failure information are carried on a third
       MAC CE.

In an optional embodiment, the sending submodule 406 is configured to send the consistent LBT failure message to the second terminal on available resources for the SL transmission in a case that the available resources for the SL transmission exist.

In an optional embodiment, the device further includes the sending submodule 406 and a first receiving module 404.

The sending submodule 406 is configured to send an LBT request assistance to a network device in a case that available resources for the SL transmission do not exist.

The first receiving module 404 is configured to receive auxiliary unlicensed resources configured by the network device for the first terminal through COT sharing. The auxiliary unlicensed resources include available resources obtained by the network device assisting in performing the LBT.

The sending submodule 406 is configured to send the consistent LBT failure message to the second terminal on the auxiliary unlicensed resources.

In an optional embodiment, the LBT request assistance is carried in an SL-BSR or an RRC message.

In an optional embodiment, the sending submodule 406 is configured to send the consistent LBT failure message to the second terminal through a candidate resource pool configured on a default granted carrier in a case that available resources for the SL transmission do not exist.

In an optional embodiment, the candidate resource pool is a candidate resource pool of mode 2.

In an optional embodiment, in case of a unicast service of the first terminal, the default granted carrier is determined through negotiation using a PC5-RRC message during the procedure that the first terminal establishes a connection with the second terminal.

In an optional embodiment, in case of a unicast, multicast or broadcast service of the first terminal, the default granted carrier is configured by a network device.

In an optional embodiment, when the first terminal is in a unicast, multicast or broadcast state, the default granted carrier is configured by a network device based on a Layer 2 target address, QoS or logic channel.

In an optional embodiment, the first consistent LBT failure indication is carried on the first MAC CE, and the consistent LBT failure information is carried on the second MAC CE. The device further includes a first receiving module 404.

The first receiving module 404 is configured to receive SL grant resources scheduled by the second terminal for the first terminal. The SL grant resources scheduled by the second terminal for the first terminal in a case that a first LBT timer expires and SL transmission data sent by the first terminal is not received, and the first LBT timer is started when the second terminal receives the first MAC CE.

The sending submodule 406 is configured to send the first MAC CE to the second terminal, and the first MAC CE includes the first consistent LBT failure indication.

The sending submodule 406 is configured to send the second MAC CE to the second terminal on SL transmission resources, and the second MAC CE includes the consistent LBT failure information.

In an optional embodiment, the target operation includes the LBT consistent failure recovery, and the unlicensed resources are resources on all carriers in a candidate resource set. The execution module 402 includes a sending submodule 406.

The sending submodule 406 is configured to send a second consistent LBT failure indication to a network device in a case that the consistent LBT failure is triggered on all BWPs of the candidate resource set.

In an optional embodiment, the second consistent LBT failure indication is carried in an RRC signaling.

In an optional embodiment, the second consistent LBT failure indication includes the candidate resource set determined by a MAC layer for a Layer 2 target address, a logic channel or an HARQ process.

In an optional embodiment, the apparatus further includes a first receiving module 404.

The first receiving module 404 is configured to receive transmission resources configured by the network device for the SL transmission.

In an optional embodiment, the apparatus further includes a MAC module 403 and the sending submodule 406.

The MAC module 403 is configured for transmitting a third consistent LBT failure indication through a MAC layer of the first terminal to a RRC layer in a case that the consistent LBT failure is triggered on all the BWPs of the candidate resource set.

The sending submodule 406 is further configured for sending the second consistent LBT failure indication from the RRC layer to the network device through an RRC signaling in a case that the RRC layer receives the third consistent LBT failure indication from the MAC layer.

In an optional embodiment, a candidate resource set of the first terminal includes the unlicensed resources, and the candidate resource set includes a resource set determined by the first terminal for a Layer 2 target address, a logic channel or a HARQ process.

Figure 10:
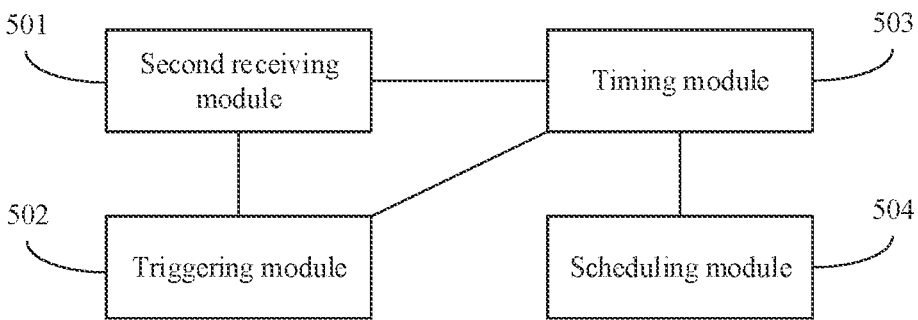
FIG. 10 is a block diagram of an SL communication device according to an exemplary embodiment of the disclosure.

FIG. 10 illustrates a block diagram of an SL communication method device according to an exemplary embodiment of the disclosure. The device is configured to implement a second terminal for SL transmission, or one or more modules in the second terminal. The device includes a second receiving module 501 and a triggering module 502.

The second receiving module 501 is configured to receive a consistent LBT failure message sent by a first terminal. The consistent LBT failure message is sent by the first terminal after a consistent LBT failure is triggered on unlicensed resources.

The triggering module 502 is configured to trigger an RLF.

In an optional embodiment, the consistent LBT failure message includes at least a first consistent LBT failure indication or consistent LBT failure information.

The consistent LBT failure information includes at least one of an LBT failure carrier, an LBT failure BWP, an LBT failure carrier set, an LBT failure BWP set, a target switched carrier, a target switched BWP, a target selected carrier, or a target selected BWP.

In an optional embodiment, the consistent LBT failure message includes the target switched carrier or the target switched BWP, the device further includes a timing module 503.

The timing module 503 is configured to start a second LBT timer in response to the consistent LBT failure message.

The triggering module 502 is configured to trigger the RLF in a case that the second LBT timer expires and SL transmission data sent by the first terminal on target transmission resources is not received.

The target transmission resources include at least one of the target switched carrier, the target switched BWP, or a default granted carrier.

In an optional embodiment, the second receiving module 501 is configured to receive the second LBT timer configured by a network device for the second terminal.

In an optional embodiment, the consistent LBT failure message does not include the target switched carrier or the target switched BWP.

The triggering module 502 is configured to trigger the RLF in response to the consistent LBT failure message.

In an optional embodiment, the consistent LBT failure message includes the first consistent LBT failure indication and the consistent LBT failure information, the device further includes a timing module 503 and a scheduling module 504.

The second receiving module 501 is configured to receive a first MAC CE sent by the first terminal. The first MAC CE carries the first consistent LBT failure indication.

The timing module 503 is configured to start a first LBT timer in response to the first MAC CE, and the first LBT timer is configured by a network device for the second terminal.

The scheduling module 504 is configured to schedule SL grant resources to the first terminal in a case that the first LBT timer expires and SL transmission data sent by the first terminal is not received.

The SL grant resources are used for sending the consistent LBT failure information.

Figure 11:
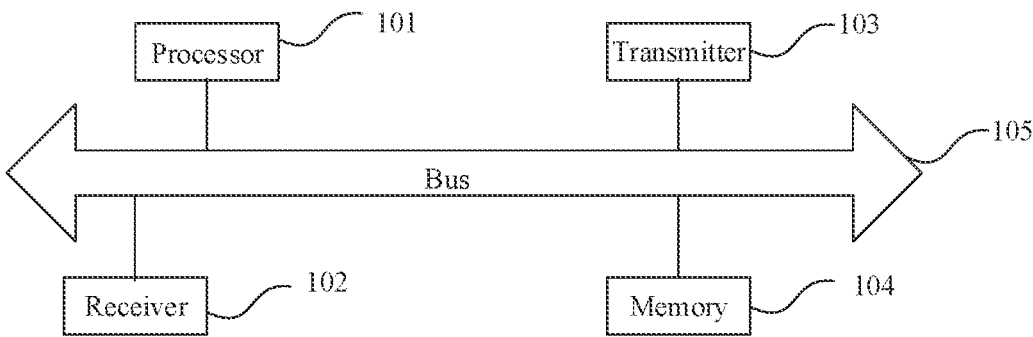
FIG. 11 is a structural diagram of a communication device according to an exemplary embodiment of the disclosure.

FIG. 11 shows a structural diagram of a communication device (a terminal or a network device) according to an exemplary embodiment of the disclosure. The communication device includes a processor 101, a receiver 102, a transmitter 103, a memory 104 and a bus 105.

The processor 101 includes one or more processing cores, and the processor 101 executes various functional applications and information processing by executing software programs and modules.

The receiver 102 and the transmitter 103 may be embodied as a communication component which may be a communication chip.

The memory 104 is connected to the processor 101 through the bus 105.

The memory 104 is configured to store at least one instruction, and the processor 101 is configured to execute the at least one instruction to implement various operations in the above method embodiments.

Furthermore, the memory 104 may be embodied by any type of volatile or non-volatile storage devices or combinations thereof. The volatile or non-volatile storage devices include, but are not limited to a magnetic disk or an optical disk, an Electrically-Erasable Programmable Read Only Memory (EEPROM), an Erasable Programmable Read Only Memory (EPROM), a Static Random Access Memory (SRAM), a Read-Only Memory (ROM), a magnetic memory, a flash memory, a Programmable Read-Only Memory (PROM).

When the communication device is implemented as a terminal, the processor and the transceiver in the communication device related to the embodiment of the disclosure may perform operations performed by the terminal in any of the methods as described above, which are not elaborated here.

In a possible implementation, in a case that the communication device is implemented as a first terminal,
   the processor is configured to: perform LBT on unlicensed resources, and perform a target operation in a case that a consistent LBT failure is triggered on the unlicensed resources.

In a possible implementation, in a case that the communication device is implemented as a second terminal,
   the transceiver is configured to receive a consistent LBT failure message sent by a first terminal, the consistent LBT failure message is sent by the first terminal after a consistent LBT failure is triggered on unlicensed resources, and
   the processor is configured to trigger an RLF.

In an exemplary embodiment, there is also provided a computer-readable storage medium, having stored thereon at least one instruction, at least one program, a code set or an instruction set. The at least one instruction, the at least one program, the code set or the instruction set are loaded and executed by a processor to implement the SL communication methods performed by the communication device provided in the above method embodiments.

In an exemplary embodiment, there is also provided a chip, and the chip includes at least a programmable logic circuit or program instructions. The chip is configured to implement the SL communication methods as described in the above aspects when the chip is run on a computer device.

In an exemplary embodiment, there is also provided a computer program product. The computer program product enables a computer device to perform the SL communication methods as described in the above aspects when the computer program product is run on a processor of the computer device.

It may be understood by those of ordinary skill in the art that all or part of operations for implementing the above embodiments may be completed by hardware, or may be completed by a program instructing related hardware. The program may be stored in a computer-readable storage medium, and the above-mentioned storage medium mentioned may be a ROM, a magnetic disk or an optical disk, etc.

The above descriptions are only optional embodiments of the disclosure, and are not intended to limit the disclosure. Any modification, equivalent replacement, improvement or the like made within the spirit and principle of the disclosure should be included in the scope of protection of the disclosure.

The invention claimed is:

1. A Side Link (SL) communication method, applied to a first terminal for SL transmission, comprising:

performing Listen Before Talk (LBT) on unlicensed resources; and performing a target operation in a case that a consistent LBT failure is triggered on the unlicensed resources, wherein the target operation comprises at least one of frequency point switching, sending a failure message, or LBT consistent failure recovery, wherein the target operation comprises the LBT consistent failure recovery, and the unlicensed resources are resources on all carriers in a candidate resource set, wherein performing the target operation in the case that the consistent LBT failure is triggered on the unlicensed resources comprises:

sending a second consistent LBT failure indication to a network device in a case that the consistent LBT failure is triggered on all bandwidth parts (BWPs) of the candidate resource set, wherein the method further comprises:

transmitting, by a Medium Access Control (MAC) layer of the first terminal, a third consistent LBT failure indication to a Radio Resource Control (RRC) layer in the case that the consistent LBT failure is triggered on all BWPs of the candidate resource set, wherein sending the second consistent LBT failure indication to the network device in the case that the consistent LBT failure is triggered on all BWPs of the candidate resource set comprises:

sending, by the RRC layer, the second consistent LBT failure indication to the network device through an RRC signaling in a case that the RRC layer receives the third consistent LBT failure indication from the MAC layer.

2. The method of claim 1, further comprising:

receiving, by the MAC layer of the first terminal, an LBT failure indication on the unlicensed resources transmitted by a physical layer (PHY);

starting or restarting, by the MAC layer, an LBT failure detection timer, and increasing, by the MAC layer, an LBT failure count by 1; and determining, by the MAC layer, that the consistent LBT failure is triggered on the unlicensed resources in a case that the LBT failure count is equal to or greater than an LBT detection number threshold.

3. The method of claim 2, wherein the LBT detection number threshold and the LBT failure detection timer are configured by a network device for the first terminal.

4. The method of claim 1, wherein the target operation comprises sending the failure message, and the SL transmission further comprises a second terminal, wherein performing the target operation in the case that the consistent LBT failure is triggered on the unlicensed resources comprises:

sending a consistent LBT failure message to the second terminal in a case that the consistent LBT failure is triggered on the unlicensed resources, the consistent LBT failure message comprising at least a first consistent LBT failure indication or consistent LBT failure information, wherein the consistent LBT failure information comprises at least one of an LBT failure carrier, an LBT failure BWP, an LBT failure carrier set, an LBT failure BWP set, a target switched carrier, a target switched BWP, a target selected carrier, or a target selected BWP.

5. The method of claim 1, wherein the second consistent LBT failure indication is carried in the RRC signaling.

6. The method of claim 1, wherein after sending the second consistent LBT failure indication to the network device, in the case that the consistent LBT failure is triggered on all the BWPs of the candidate resource set, the method further comprises:

receiving transmission resources configured by the network device for the SL transmission.

7. A Side Link (SL) communication method device, configured for realization of a first terminal for SL transmission, comprising:

a memory having stored thereon a computer program;

a processor; and a transceiver connected to the processor, wherein the processor is configured to:

perform Listen Before Talk (LBT) on unlicensed resources; and perform a target operation in a case that a consistent LBT failure is triggered on the unlicensed resources, wherein the target operation comprises at least one of frequency point switching, sending a failure message, or LBT consistent failure recovery, wherein the target operation comprises the LBT consistent failure recovery, and the unlicensed resources are resources on all carriers in a candidate resource set, wherein the transceiver is further configured to:

send a second consistent LBT failure indication to a network device in a case that the consistent LBT failure is triggered on all bandwidth parts (BWPs) of the candidate resource set, wherein the transceiver is further configured to:

transmit a third consistent LBT failure indication through a MAC layer of the first terminal to a Radio Resource Control (RRC) layer in a case that the consistent LBT failure is triggered on all the BWPs of the candidate resource set, send the second consistent LBT failure indication from the RRC layer to the network device through an RRC signaling in a case that the RRC layer receives the third consistent LBT failure indication from the MAC layer.

8. The device of claim 7, wherein the transceiver is configured to:

receive an LBT failure indication on the unlicensed resources transmitted by a physical layer (PHY) through the MAC layer of the first terminal;

wherein the processor is further configured to:

start or restart an LBT failure detection timer through the MAC layer, and increases an LBT failure count by 1; and determine that the consistent LBT failure is triggered on the unlicensed resources through the MAC layer in a case that the LBT failure count is equal to or greater than an LBT detection number threshold.

9. The device of claim 8, wherein the LBT detection number threshold and the LBT failure detection timer are configured by a network device for the first terminal.

10. The device of claim 7, wherein the target operation comprises sending the failure message, the SL transmission further comprises a second terminal, and the transceiver is further configured to:

send a consistent LBT failure message to the second terminal in a case that the consistent LBT failure is triggered on the unlicensed resources, the consistent LBT failure message comprising at least a first consistent LBT failure indication or consistent LBT failure information, wherein the consistent LBT failure information comprises at least one of an LBT failure carrier, an LBT failure BWP, an LBT failure carrier set, an LBT failure BWP set, a target switched carrier, a target switched BWP, a target selected carrier, or a target selected BWP.

11. The device of claim 7, wherein the second consistent LBT failure indication is carried in the RRC signaling.

12. The device of claim 7, wherein the transceiver is further configured to:

receive transmission resources configured by the network device for the SL transmission.

* * * * *